(12) United States Patent
Schoendeling et al.

(10) Patent No.: US 11,962,260 B2
(45) Date of Patent: Apr. 16, 2024

(54) METHOD FOR DETECTING THE ROTARY ANGLE POSITIONS OF ROTATING PARTS OF A WIPER MOTOR, AND WIPER MOTOR

(71) Applicant: Valeo Systemes d'Essuyage, La Verriere (FR)

(72) Inventors: Matthias Schoendeling, Bietigheim-Bissingen (DE); Michael Schaeuble, Bietigheim-Bissingen (DE); Joerg Buerkle, Bietigheim-Bissingen (DE); Tobias Groenig, Bietigheim-Bissingen (DE)

(73) Assignee: Valeo Systemes d'Essuyage, La Verriere (FR)

( * ) Notice: Subject to any disclaimer, the term of this patent is extended or adjusted under 35 U.S.C. 154(b) by 30 days.

(21) Appl. No.: 17/608,708

(22) PCT Filed: May 4, 2020

(86) PCT No.: PCT/EP2020/062350
§ 371 (c)(1),
(2) Date: Nov. 3, 2021

(87) PCT Pub. No.: WO2020/233974
PCT Pub. Date: Nov. 26, 2020

(65) Prior Publication Data
US 2022/0224260 A1    Jul. 14, 2022

(30) Foreign Application Priority Data

May 21, 2019    (DE) .......................... 102019113549.4

(51) Int. Cl.
*H02P 6/16*    (2016.01)
*B60S 1/08*    (2006.01)
*H02K 7/116*    (2006.01)

(52) U.S. Cl.
CPC .................. *H02P 6/16* (2013.01); *B60S 1/08* (2013.01); *H02K 7/1166* (2013.01)

(58) Field of Classification Search
CPC ............ H02P 6/16; B60S 1/08; H02K 7/1166
See application file for complete search history.

(56) References Cited

U.S. PATENT DOCUMENTS 6,111,378 A * 8/2000 LeMay ............... B60R 16/0315
                                                        318/443
9,660,559 B2    5/2017 Kimura et al.
(Continued)

FOREIGN PATENT DOCUMENTS

CN        101121414 A      2/2008
DE    102012222273 A1      6/2014
(Continued)

OTHER PUBLICATIONS

European Patent Office, International Search Report and Written Opinion of corresponding international application No. PCT/EP2020/062350, dated Aug. 10, 2020.
(Continued)

*Primary Examiner* — Cortez M Cook
(74) *Attorney, Agent, or Firm* — Valeo Systemes d'Essuyage

(57) ABSTRACT

The invention relates to a method for detecting the rotary angle positions ($\alpha$, $\beta$) of rotating parts of a wiper motor, the wiper motor having a brushless electric motor as a first part which comprises a rotor rotating about a first axis of rotation and which drives a gear wheel as a second part which rotates about a second axis of rotation and which comprises a driven shaft, and the rotary angle positions ($\alpha$, $\beta$) of the two rotating parts being detected by means of two sensor devices each
(Continued)

having a signal generating element and a sensor element for detecting a changing physical parameter of the signal generating element.

14 Claims, 3 Drawing Sheets

(56) References Cited

U.S. PATENT DOCUMENTS

| | | | |
|---|---|---|---|
| 9,929,624 B2 | 3/2018 | Ikeda | |
| 10,574,160 B2 | 2/2020 | Kondoh et al. | |
| 11,201,525 B2 | 12/2021 | Foerch | |
| 2016/0241108 A1* | 8/2016 | Kimura | H02P 6/16 |
| 2016/0276899 A1 | 9/2016 | Ikeda | |

FOREIGN PATENT DOCUMENTS

| | | | |
|---|---|---|---|
| DE | 102017121222 A1 | 3/2019 | |
| EP | 2840700 A1 | 2/2015 | |
| EP | 3051672 A1 | 8/2016 | |
| JP | 2000283703 A | 10/2000 | |
| JP | 2008148412 A | 6/2008 | |
| JP | 2011057174 A | 3/2011 | |
| JP | 2016175638 A | 10/2016 | |
| JP | 2015126548 A1 | 1/2017 | |
| JP | 6438176 B1 | 12/2018 | |
| WO | 2013149952 A1 | 10/2013 | |
| WO | 2013157558 A1 | 10/2013 | |
| WO | 2015133291 A1 | 4/2017 | |

OTHER PUBLICATIONS

Japanese Patent Office, Notice of Reasons for Refusal of corresponding Japanese Application No. 2021-569132, dated Jan. 20, 2023.
Japanese Patent Office, Notice of Reasons for Refusal (with English translation) of corresponding Japanese Application No. 2021-569132, dated Jun. 9, 2023.
Chinese Patent Office, Office Action of corresponding Chinese Application No. 202080037778.3, dated May 12, 2023.

* cited by examiner

METHOD FOR DETECTING THE ROTARY ANGLE POSITIONS OF ROTATING PARTS OF A WIPER MOTOR, AND WIPER MOTOR

CROSS-REFERENCE TO RELATED APPLICATIONS

This application is filed under 35 U.S.C. § 371 U.S. National Phase of International Application No. PCT/EP2020/062350 filed May 4, 2020 (published as WO2020233974), which claims priority benefit to German application No. 102019113549.4 filed on May 21, 2019, the disclosures of which are herein incorporated by reference in their entirety.

TECHNICAL FIELD

The invention relates to a method for detecting the rotary angle positions of rotating parts of a wiper motor having the features of the precharacterizing clause of claim 1. The invention furthermore relates to a wiper motor which is configured to carry out a method according to the invention.

BACKGROUND ART

A wiper motor which is configured to carry out a method according to the precharacterizing clause of claim 1 is known from DE 10 2017 121 222 A 1 by the applicant. The known wiper motor or the known method is distinguished in that two sensor devices are provided for detecting the rotary angle positions of a rotor of a brushless electric motor and of a gear wheel which is driven by the electric motor and serves at least indirectly for driving a wiper. Each of the two sensor devices comprises a signal generating element and a sensor element for detecting a changing physical parameter of the signal generating element. Typically, sensor devices are configured in the form of Hall sensors, in which the Hall sensor detects the changes of an element which moves past the Hall sensor and generates a magnetic field. A further significant feature of the known sensor devices is that, when a magnetic field is first detected or when the electric motor is started, said sensor devices are not capable of detecting an absolute angle position of the rotating part (rotor or gear wheel). On the contrary, further information or a certain rotary angle of the rotating part is needed before an evaluating unit of the sensor device can draw a conclusion regarding an absolute angle of the rotating part.

In particular in conjunction with brushless electric motors, it is desirable or required to know the rotary angle position as rapidly and exactly as possible for the energizing or activating of the individual wire windings of the stator. This is similarly also desirable in order to detect a rotary angle position of a driven shaft of the wiper motor, said driven shaft being connected to the wiper motor.

SUMMARY

The method according to the invention for detecting the rotary angle positions of rotating parts of a wiper motor having the features of claim 1 has the advantage of permitting a very rapid and precise detection of an absolute rotary angle of a rotating part, in particular when starting up a wiper motor. This is made possible according to the invention in accordance with the teaching of claim 1 in that an absolute rotary angle position of the rotating part is detected by means of at least one of the sensor devices. What is meant here is that a conclusion can be drawn regarding the absolute rotary angle of the rotating part with respect to an angle reference (0 degrees) just from first information or a first detection of a physical parameter. This in particular even includes the situation in which the electric motor is still not rotating, i.e. that the angle position can be detected even in a stationary state of the otherwise rotating part.

Advantageous developments of the method according to the invention for detecting the rotary angle positions of rotating parts of a wiper motor are presented in the dependent claims.

In a preferred refinement of the method according to the invention, it is provided that a change of a magnetic field of the signal generating element is detected by means of the sensor device that detects the absolute angle position In particular, it is therefore possible, for example, to draw a conclusion about an absolute angle position of the rotating part from the magnitude of the magnetic flux density of the magnetic field in combination with the orientation thereof.

However, other physical operative principles are also conceivable, for example optically operating measuring devices or sensor devices which detect other physical parameters, such as inductance or the like.

A further preferred method provides that the rotary angle positions of the two rotating parts (in particular rotor and gear wheel) are matched with each other in such a manner that a specific rotary angle position of the one part (for example of the gear wheel or of the driven shaft) is matched with at least one specific rotary angle position of the other part (for example of the rotor), that currently matched rotary angle positions of the two rotating parts are compared to values stored in a storage unit and that a signal, an error message or the like is generated when a stored limit value between current values and stored values is exceeded.

The background of this preferred method is that typically in the new state or in a state of the wiper motor in which the rotating parts are disposed with little play or no play with respect to one another, the matched rotary angle positions of the parts have only small tolerances with respect to one another. However, with increasing wear or increasing play between the rotating parts, the detected rotary angle positions of the rotating parts change in such a manner that, for example, there is a greater angular offset or a greater angular difference between the rotary angle positions than is the case in the new state or when there is no play. The preferred method provided therefore makes it possible to be able to draw a conclusion regarding the wear of the rotating parts of the wiper motor and, for example, because of a corresponding error message read within the scope of inspections or similar measures, to be able to undertake a repair or a corresponding replacement of the wiper motor. Furthermore, such a method moreover makes it fundamentally possible, for example, also to adapt or to modify a temporal or angle-conforming activation of wire windings of the stator, in order to be able to always obtain the same movement sequence at the wiper motor and therefore at the wipers.

A further preferred refinement of the method according to the invention, in which, for example, a conclusion can be drawn regarding increased friction or blocking of rotating parts of the wiper motor, provides that during operation of the wiper motor, a rotary angle velocity of at least one of the two rotating parts is detected and that the motion of the wiper motor is stopped and/or a signal and/or an error message or the like is generated when the rotary angle velocity falls short of a limit value. Damage or overloading of the wiper motor can thereby be prevented.

The invention furthermore comprises a wiper motor which is preferably operated in accordance with a method according to the invention described to this extent. The wiper motor is distinguished, as known per se, by a brushless electric motor which has a rotor and which drives a driven shaft by means of a gear wheel, and comprising two sensor devices each having a signal generating element and a sensor element for detecting a changing physical parameter of the signal generating element, the sensor devices being configured to detect the rotary angle positions of the rotor and of the driven shaft. The wiper motor according to the invention is distinguished in that at least one of the two sensor devices is configured to measure an absolute angle.

It is particularly preferred that the at least one sensor device is matched to the rotor of the electric motor for measuring the absolute angle. This therefore relates to the fact that, for the activation of the wire windings of the stator correctly in terms of time, it is essential to know the (absolute) rotary angle position of the rotor as rapidly as possible. Furthermore, it should be taken into consideration here that, owing to the reduction in the rotational speed of the electric motor, one and the same absolute rotary angle position of the gear wheel or of the driven shaft can optionally be matched with a plurality of different rotary angle positions of the rotor. From the knowledge of the absolute rotary angle of the gear wheel or of the driven shaft, it is therefore not inevitably possible to be able to draw a conclusion regarding the absolute rotary angle position of the rotor.

In a structurally preferred refinement of the wiper motor, at least one of the signal generating elements of the two sensor devices is configured to generate a magnetic field that is detectable by the sensor element and that changes as a function of the rotary angle position.

In a structurally preferred arrangement and configuration of the wiper motor, it is moreover provided that the two sensor elements are disposed in the area of a shared circuit board and are connected to the circuit board in an electrically conductive manner.

There are various possibilities in respect of the specific arrangement of the sensor elements. In a development of the last proposal for use of a shared circuit board, it can be provided that at least one sensor element is disposed so as to not cover the axis of rotation of the rotor or the driven shaft.

In this case, it is moreover provided that the sensor element detecting the rotary angle position of the driven shaft or of the rotor is disposed so as to cover the axis of rotation of the driven shaft.

Furthermore, it can be provided in an advantageous structural refinement of the circuit board that the latter has a cutout and that the signal generating element assigned to the rotor is disposed in the area of the cutout. A particularly compact construction of the wiper motor can thereby be made possible.

With regard to as compact an arrangement or configuration of the wiper motor as possible, it is moreover of advantage if the plane of the circuit board runs parallel to the axis of rotation of the rotor and perpendicular to the axis of rotation of the driven shaft.

In order to obtain additional functionalities of the wiper motor, it can moreover be provided that an storage and evaluating unit is provided which is at least configured to match a rotary angle position of the driven shaft with at least one rotary angle position of the rotor and to compare it to stored matched values of the driven shaft and of the rotor during operation of the wiper motor, and that a signal, an error message or the like can be generated when a stored limit value between current matched values and stored matched values is exceeded.

A development of the last proposal provides that the storage and evaluating unit is additionally configured to detect a rotary angle velocity of at least one of the rotating parts during operation of the wiper motor and to generate a signal, an error message or the like and/or to reduce the power output of the wiper motor and/or to stop its operation when the rotary angle velocity falls short of a predefined limit value.

BRIEF DESCRIPTION OF THE DRAWINGS

Further advantages, features and details of the invention will emerge from the following description of preferred exemplary embodiments and with reference to the drawing, in which.

DETAILED DESCRIPTION

Identical elements or elements having an identical function are provided with the same reference numbers in the figures.

Figure 1:
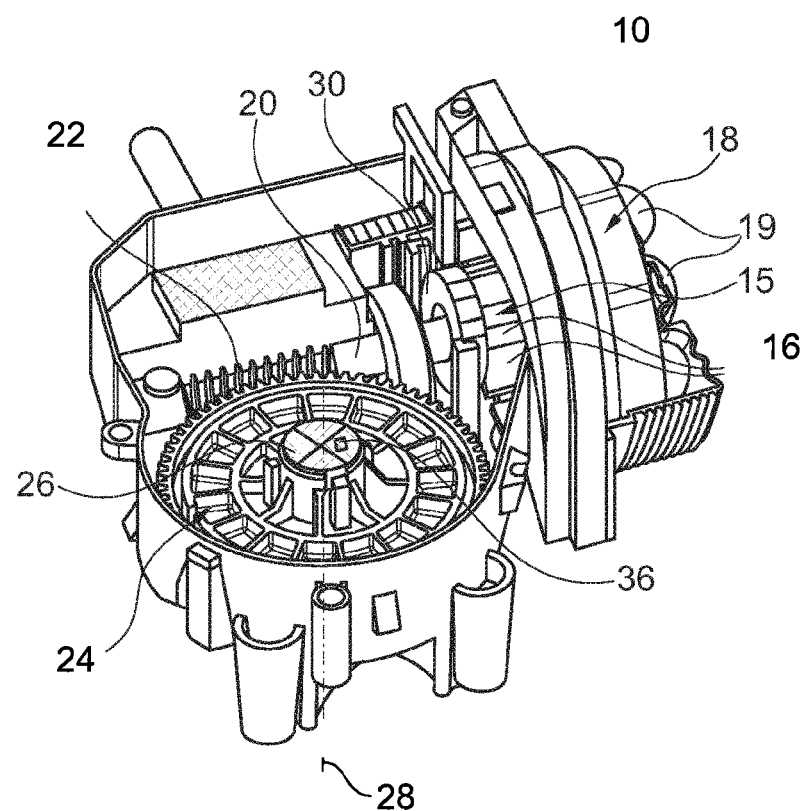
FIG. 1 shows a perspective, partially sectioned view of a wiper motor.
Figure 2:
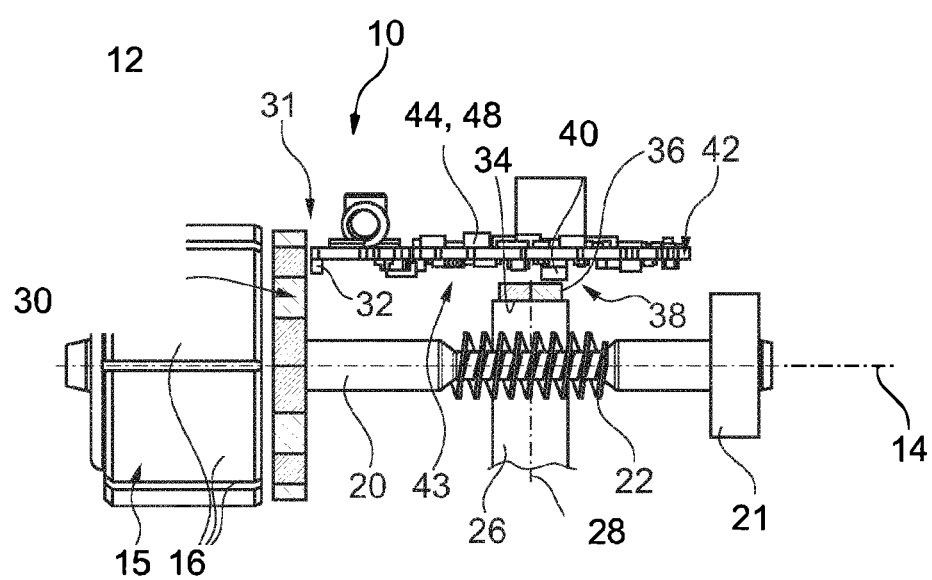
FIG. 2 shows a perspective, partially sectioned view of a wiper motor according to FIG. 1, FIG. 3 to FIG. 6 each show, in simplified illustrations, different arrangements of sensor devices for detecting the rotary angle position of a rotor and a gear wheel.

FIGS. 1 and 2 illustrate the essential components of a wiper motor 10 for driving a wiper (not illustrated). The wiper motor 10 has a brush less electric motor 12 which has a rotor 15 which rotates about an axis of rotation 14 and has magnetic elements 16. The rotor 15 is surrounded radially by a stator 18 which is illustrated only in FIG. 1 and which in a known manner has a plurality of wire windings 19 in such a manner that the rotor 15 is set into a rotational movement by a phase-displaced or temporally consecutive energizing of the individual wire windings 19.

The rotor 15 is connected to a rotor shaft 20 for rotation therewith, the rotor shaft being mounted rotatably in a bearing device 21, for example, on the side facing away from the rotor 15. In a central section of the rotor shaft 20, the latter has a worm toothing 22 which meshes with a mating toothing on a gear wheel 24. The gear wheel 24 is connected to a driven shaft 26 for rotation therewith and is mounted rotatably about an axis of rotation 28. The driven shaft 26 is coupled in turn in a manner known per se, for example, to a wiper linkage or else directly to the wiper to be moved.

The rotor 15 or the rotor shaft 20 is disposed close to the rotor 15 in operative connection with a first magnetic element arrangement 30. In particular, the first magnetic element arrangement 30 is connected to the rotor shaft 20 for rotation therewith. The first magnetic element arrangement 30 is part of a first sensor device 31 for detecting the rotary angle position of the rotor shaft 20 and therefore of the rotor 15. For this purpose, the first magnetic element arrangement 30 interacts, for example, with a sensor element 32. The sensor element 32 comprises, for example, a Hall sensor arrangement which is configured to draw a conclusion regarding the absolute rotary angle position of the rotor 15 or of the rotor shaft 20 directly from the rotary angle position of the first magnetic element arrangement 30. The absolute rotary angle position is required in order to permit a phase-conforming or angle-conforming energizing of the wire windings 19 of the stator 18. An absolute rotary angle position is understood as meaning a rotary angle of the rotating part with respect to a fixed reference position (0 degrees angle position).

Furthermore, a second magnetic element arrangement 36 is provided on an end surface 34 of the driven shaft 26. The second magnetic element arrangement 36 is part of a second sensor device 38 which is configured to detect an absolute angle position of the driven shaft 26 and therefore of the gear wheel 24. For this purpose, the second magnetic element arrangement 36, for example, likewise interacts with a sensor element 40 which likewise has, for example, a Hall sensor arrangement which is configured to draw a conclusion regarding an absolute angle position of the driven shaft 26 or of the gear wheel 24 on the basis of the changing magnetic field of the second magnetic element arrangement 36.

The two sensor elements 32 and 40 are disposed in an electrically conductive manner on a shared circuit board 42. The plane of the circuit board 42 runs parallel to the axis of rotation 14 of the rotor 15 and perpendicular to the axis of rotation 28 of the driven shaft 26. In the exemplary embodiment illustrated in FIG. 2, the two sensor elements 32, 40 are each disposed on the lower side 43 of the circuit board 42, said lower side facing the rotor shaft 20. Furthermore, components for activating or for driving the wiper motor 10 are disposed, as known per se, on the circuit board 42. Said components comprise, by way of example, an IC 44 or a similar logical circuit which is configured to activate or to energize in particular wire windings 19 of the stator 18. For this purpose, the information from the two sensor devices 31 of 38 is supplied as an input variable to the IC 44.

Figure 3:
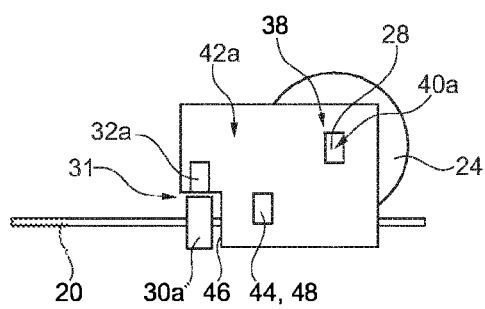

FIGS. 3 to 6 illustrate different arrangements of the two sensor devices 31 and 38. It is illustrated in FIG. 3 that the circuit board 42a has a rectangular cutout 46, on the edge of which the sensor element 32a is disposed. The first magnetic element arrangement 30a enters at least in regions into the cutout 46. Furthermore, it can be seen that the sensor element 40a is disposed so as to align with the axis of rotation 28, i.e. so as to cover the second magnetic element arrangement 36.

Figure 4:
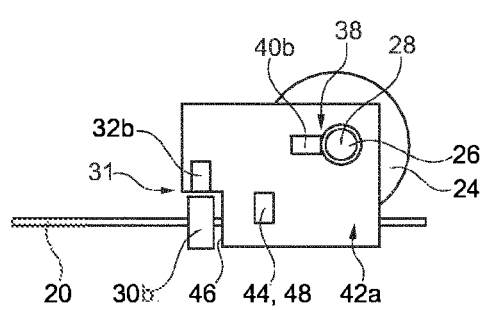

FIG. 4 illustrates the case in which the sensor element 40b is disposed laterally offset with respect to the axis of rotation 28 of the driven shaft 26 while the arrangement of the first magnetic element arrangement 30b and of the sensor element 32b corresponds to that of the first magnetic element arrangement 30a of FIG. 3.

Figure 5:
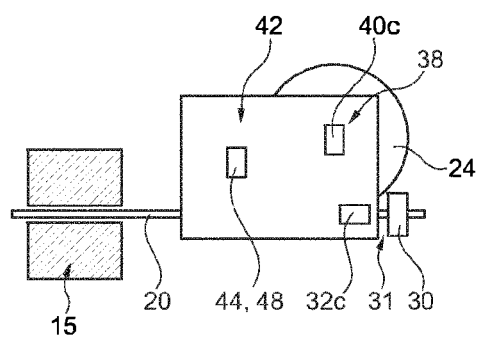

FIG. 5 illustrates an arrangement approximately according to FIG. 2 in which the rectangular circuit board 42 is provided on the side facing the first magnetic element arrangement 30 with the sensor element 32c which is disposed at a distance from the axis of rotation 14 of the rotor shaft 20. The first magnetic element arrangement 30 is located outside the circuit board 42 on the side of the circuit board 42 that faces away from the rotor 15. The arrangement of the sensor element 40c corresponds to that of the sensor element 40a according to FIG. 3.

Figure 6:
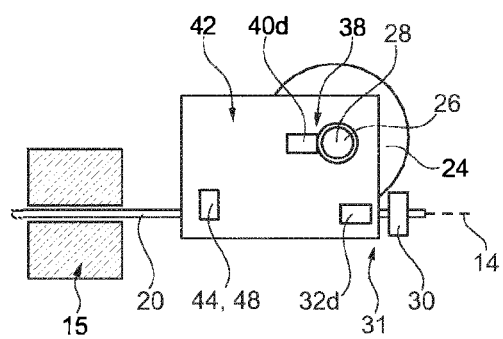

Finally, FIG. 6, as a modification of the arrangement in FIG. 5, illustrates the case in which the two sensor elements 32d and 40d are disposed so as not to cover the axes of rotation 14 and 28 of the rotor shaft 20 and of the driven shaft 26, respectively.

Figure 7:
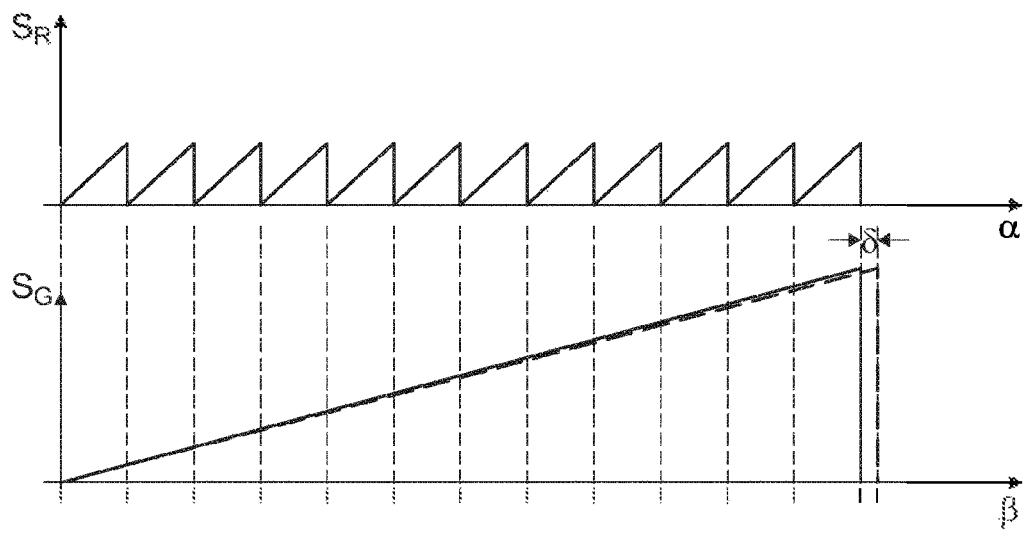
FIG. 7 shows a diagram for explaining the matching of different rotary angle positions of a rotor and of a gear wheel for detecting a possible wear.

The IC 44 optionally has a storing and evaluating unit 48 which permits additional functionalities of the wiper motor 10. FIG. 7 thus illustrates one above the other the signals SR and SG detected by the sensor devices 31 and 38 over the absolute rotary angle α of the rotor 15 and 13 of the gear wheel 24, respectively. It is seen here that, at a revolution about 360Q of the gear wheel 24 (maximum of the signal SG), the rotor 15 in the new state of the components or not having any play between the components has rotated, for example, twelve times. Furthermore, the dashed illustration of the signal profile of the signal SG in the lower part of FIG. 7 shows the situation which arises after a certain operating duration or when wear occurs between those parts of the rotor shaft 20 or of the rotor 15 and of the driven shaft 26 or of the gear wheel 24 that are operatively connected to one another. In particular, it is seen that, after twelve revolutions of the rotor 12, the signal SG of the gear wheel 24 has not yet reached its maximum, that is to say that the gear wheel 24 is still not revolving about 360°. This is the case only after an additional angle offset σ.

As soon as the angle offset a exceeds a limit value stored in the storing and evaluating unit 48, a conclusion is drawn regarding wear at the components of the wiper motor 10 and so that this is stored, for example, in an error memory as an error message, a corresponding signal is generated or the like.

Figure 8:
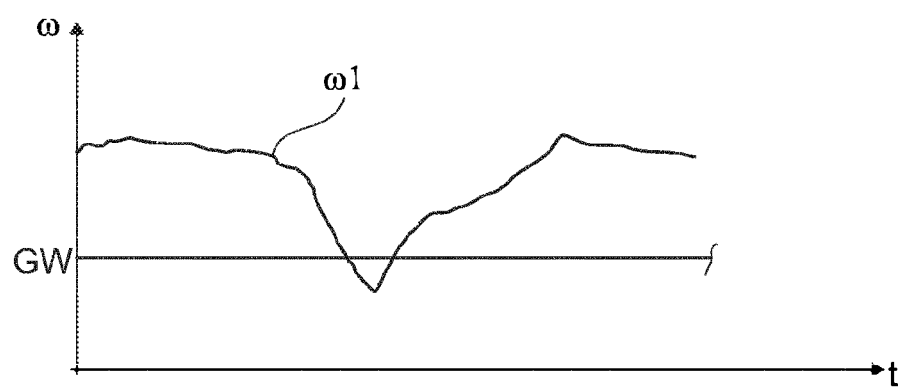
FIG. 8 shows a diagram for explaining the detection of a rotary angle velocity of rotating parts of the wiper motor for detecting a possible blockage of rotating parts.

Finally, it is explained with regard to FIG. 8 that the storing and evaluating unit 48 can furthermore be configured to detect a rotary angle velocity ω of the rotor shaft 20 and/or of the driven shaft 26 over the time t of the wiper motor 10. If, during the operation of the wiper motor 10, the rotary angle velocity ω1 falls short of, for example, a lower limit value GW, a conclusion is drawn that the wiper motor 10 has increased friction values or a tendency to block due to an internal error or else that the wiper motor 10 is prevented from operating correctly due to external force influences, for example a snow load or the like. Also in this case, the storing and evaluating unit 48 can deposit, for example, a corresponding error in an error memory, can generate a signal or else can stop the operation of the wiper motor 10.

The wiper motor 10 described so far can be altered or modified in a wide variety of ways without departing from the concept of the invention. This consists in that at least one sensor device which serves to detect the rotary angle position of the rotor shaft 20 or of the rotor 15 and of the driven shaft 26 or of the gear wheel 24 uses an absolute angle sensor. It can thus be provided, for example, for the rotary angle information of the two sensor devices 31 and 38 and the activation of the wire windings of the stator 18 to be brought about not (internally) by the wiper motor 10, but rather by an external control device or the like. Furthermore, the sensor devices 31 and 38 can also be based on different physical operative principles and/or can have different specifications.

LIST OF REFERENCE SIGNS

10 Wiper motor
12 Electric motor
14 Axis of rotation
15 Rotor
16 Magnetic element
18 Stator
19 Wire winding
20 Rotor shaft
21 Bearing device
22 Worm gearing 24 Gear wheel
26 Driven shaft
28 Axis of rotation
30/a/b Magnetic element arrangement First sensor device
31 First sensor device
32/a/b/c/d Sensor element
34 End surface of the driven shaft
36 Magnetic element arrangement
38 Second sensor device
40/a/b/c/d Sensor element
42/a Circuit board
43 Lower side of the circuit board
44 IC
46 Cutout
48 Evaluating unit
α Angle
β Angle
σ Angle offset
ω Rotary angle velocity
DW Rotary angle
GW Limit value
S Signal
t Time

What is claimed is:

1. A method for detecting the rotary angle positions of rotating parts of a wiper motor, the wiper motor having a brushless electric motor as a first part which comprises a rotor rotating about a first axis of rotation and which drives a gear wheel as a second part which rotates about a second axis of rotation and which comprises a driven shaft, and the rotary angle positions of the two rotating parts being detected by means of two sensor devices each having a signal generating element and a sensor element for detecting a changing physical parameter of the signal generating element,
characterized in that
an absolute angle position of both rotating parts is detected by means of a respective one of the sensor devices.

2. The method according to claim 1,
characterized in that
a change of a magnetic field of the signal generating element is detected by means of the sensor device that detects the absolute angle position.

3. The method according to claim 1,
characterized in that
the rotary angle positions of the two rotating parts are matched with each other in such a manner that a specific rotary angle position of the driven shaft is matched with at least one specific rotary angle position of the rotor, that currently matched rotary angle positions of the two rotating parts are compared to values stored in a storage and evaluation unit and that a signal, an error message or the like is generated when a stored limit value between current values and stored values is exceeded.

4. The method according to claim 1,
characterized in that
during operation of the wiper motor, a rotary angle velocity of at least one of the two rotating parts is detected and that the motion of the wiper motor is stopped and/or a signal and/or an error message or the like is generated when the rotary angle velocity falls short of a limit value.

5. A wiper motor, comprising a brushless electric motor which has a rotor and which drives a driven shaft by means of a gear wheel, and comprising two sensor devices each having a signal generating element and a sensor element for detecting a changing physical parameter of the signal generating element, the sensor devices being configured to detect the rotary angle positions of the rotor and of the driven shaft, the wiper motor preferably being operated according to the method of claim 1,
characterized in that
both of the sensor devices are configured to measure an absolute angle position.

6. The wiper motor according to claim 5,
characterized in that
the at least one sensor device is configured for measuring the rotary angle position of the rotor.

7. The wiper motor according to claim 5,
characterized in that
at least one of the signal generating elements of the two sensor devices is configured to generate a magnetic field that changes as a function of the rotary angle position.

8. The wiper motor according to claim 5,
characterized in that
the two sensor elements are disposed in the area of a shared circuit board and are connected to the circuit board in an electrically conductive manner.

9. The wiper motor according to claim 8,
characterized in that
at least one sensor element is disposed so as to not cover the axis of rotation of the rotor or the driven shaft.

10. The wiper motor according to claim 9,
characterized in that
the sensor element detecting the rotary angle position (α, β) of the driven shaft (26) shaft or of the rotor (15) rotor is disposed so as to cover the axis of rotation of the driven shaft.

11. The wiper motor according to claim 8,
characterized in that
the circuit board has a cutout and that the signal generating element assigned to the rotor is disposed in the area of the cutout.

12. The wiper motor according to claim 8,
characterized in that
the plane of the circuit board runs parallel to the axis of rotation of the rotor and perpendicular to the axis of rotation of the driven shaft.

13. The wiper motor according to claim 5,
characterized in that
an storage and evaluating unit is provided which is at least configured to match a rotary angle position of the driven shaft with at least one rotary angle position of the rotor and to compare it to stored matched values of the driven shaft and of the rotor during operation of the wiper motor, and that a signal, an error message or the like can be generated when a stored limit value between current matched values and stored matched values is exceeded.

14. The wiper motor according to claim 13,
characterized in that
the storage and evaluating unit is additionally configured to detect a rotary angle velocity of at least one of the rotating parts during operation of the wiper motor and to generate a signal, an error message or the like and/or to reduce the power output of the wiper motor and/or to stop its operation when the rotary angle velocity falls short of a predefined limit value.

* * * * *